United States Patent [19]

Hunter et al.

[11] Patent Number: 4,811,132
[45] Date of Patent: Mar. 7, 1989

[54] EARLY END OF TAPE SENSING FOR A CACHE BUFFERED TAPE DRIVE

[76] Inventors: Dan A. Hunter, 875 S. Bermont Dr., Lafayette, Colo. 80026; Lawrence F. Opperman, 6407 S. Kline st., Littleton, Colo. 80127; George Gooras, 1439 Lefthand Dr., Longmont, Colo. 80501

[21] Appl. No.: 912,935

[22] Filed: Sep. 26, 1986

[51] Int. Cl.$^4$ .................. G11B 15/48; B65H 59/38
[52] U.S. Cl. .................. 360/74.3; 360/74.1; 242/189
[58] Field of Search .............. 360/72.3, 72.1, 74.1, 360/74.2, 74.3; 242/191, 186, 187, 189

[56] References Cited

U.S. PATENT DOCUMENTS

| 3,648,134 | 3/1972 | Audeh et al. | 318/6 |
| 3,666,204 | 5/1972 | Gysling | 242/189 |
| 3,697,016 | 10/1972 | Leifer et al. | 242/189 |
| 3,984,065 | 10/1976 | Bosetti et al. | 242/184 |
| 4,032,982 | 6/1977 | Arter et al. | 360/74.1 |
| 4,243,186 | 1/1981 | Peter et al. | 242/195 |
| 4,302,784 | 11/1981 | Mussatt | 360/74.1 |
| 4,366,510 | 12/1982 | Watanabe et al. | 360/74.1 |
| 4,467,411 | 8/1984 | Fry et al. | 364/200 |
| 4,507,592 | 3/1985 | Anderson | 318/268 |
| 4,550,884 | 11/1985 | Permut et al. | 242/189 |
| 4,561,608 | 12/1985 | O'Gwynn et al. | 360/74.1 |
| 4,566,652 | 1/1986 | Permut | 242/189 |
| 4,575,827 | 3/1986 | Kulakowski | 365/230 |

OTHER PUBLICATIONS

The McGraw-Hill Computer Handbook, New York, McGraw-Hill, Inc. 1983, pp. 7-63 through 7-68.
"American National Standard Recorded Magnetic Tape for Information Interchange (6250 CPI, Group-Coded Recording)", ANSI® x3.54-1976.

Primary Examiner—John H. Wolff
Assistant Examiner—Matthew J. Bussan
Attorney, Agent, or Firm—Woodcock Washburn Kurtz Machiewicz & Norris

[57] ABSTRACT

An early end of tape sensing subsystem for a data processing system, including a host computer, a cache buffer, and a magnetic tape drive subsystem utilizes outputs dependent upon the movement of a capstan wheel, swing arm, and file reel of the magnetic tape drive subsystem, determining the net movement of tape therein in order to measure the circumference of the file reel plus tape thereon. Whenever a series of valid readings from a conventional sensor are obtained indicating that the circumference of the file reel plus tape is approaching that of the circumference of the file reel itself (i.e., no tape on the file reel), a signal is sent to the microprocessor controlling the cache buffer, said signal indicating that the end of the tape is approaching.

5 Claims, 5 Drawing Sheets

EARLY END OF TAPE SENSING FOR A CACHE BUFFERED TAPE DRIVE

This invention relates generally to data processing systems including a host computer coupled through a cache buffer to a magnetic tape drive subsystem, and more particularly to a means of optimizing system performance by early detection and anticipation of an end of tape indication.

Conventional magnetic tape used in data processing applications, includes an end of tape (EOT) stripe of reflective material which is detected typically by optical sensors to prevent data from being written on the tape in its last 12 to 15 feet (e.g., see "American National Standard Recorded Magnetic Tape for Information Interchange (6250 CPI, Group-Coded Recording)", ANSI ®X3.54-1976). In data processing systems which incorporate a cache buffer between the host computer and the magnetic tape drive subsystem, a single indication of the EOT is more often insufficient for optimum system performance in that data that is contained in the cache buffer may be only partially written on the tape at EOT. Prior art data processing systems which incorporate a cache buffer and magnetic tape drive unit have typically employed an optical sensor adapted to sense the presence of light across the tape reel to detect the amount of tape left on the reel (e.g., U.S. Pat. Nos. 4,550,884 and 4,566,652). When the radius of the tape reel plus tape on the reel reached a defined minimum radius, the optical sensor's path was no longer blocked, thus permitting the light to activate an early EOT signal. Other prior art methods have utilized shaft encoders placed on the tape reels to measure tape reel radius to activate an early EOT signal when that radius reached a predefined minimum (e.g., U.S. Pat. No. 4,125,881).

Such prior art approaches while accurate, however, neglected to take into consideration variations in thickness of the magnetic tape, as well as variations in the stackings for tightness of wrap of the magnetic tape upon the reels. It would, therefore, be desirable to provide a system for detecting early EOT which is sensitive to both the thickness of the tape, and the tightness of its wrap upon the reels.

Another, more considerable drawback to the prior approaches of EOT sensing was their lack of attention towards the amount of magnetic tape remaining in the vicinity of swing arm or vacuum column subsystems used to maintain adequate tension upon the tape during its streaming. Because a considerable amount of usable magnetic tape is capable of being "stored" in the vicinity of swing arms or vacuum columns, and because such compensation systems are downstream of the read/write head, a minimum of 75000 bytes of storage space was lost in prior art systems due to their insensitivity for the slack contained in swing arms or vacuum columns. It would, therefore, be desirable to provide an early EOT sensing system which compensates for the amount of tape that is moving through the swing arm or vacuum column subsystems.

SUMMARY OF THE INVENTION

Accordingly, a general object of the present invention is to optimize performance of a data processing system which includes a host computer, a cache buffer managed by a microprocessor, and a magnetic tape drive subsystem.

It is a more specific object of the present invention to optimize system performance in a data processing system by early and accurate detection of an impending end of tape (EOT) signal.

It is another object of the present invention to provide a system for early EOT detection which is sensitive to the thickness of the magnetic tape, and to the stackings or tightness of wrap of the magnetic tape upon a file reel of the magnetic tape drive subsystem.

It is yet another object of the present invention to provide an early EOT detection system which compensates for the amount of tape that is moving through the swing arm or vacuum column subsystems in the magnetic tape drive subsystem.

It is still another object of the present invention to provide an early EOT detection system which utilizes hardware existing in the magnetic tape drive subsystem, thereby simplifying design of the detection system and reducing its ultimate cost.

Briefly, these and other objects of the present invention are accomplished by an early end of tape sensing subsystem for a data processing system, including a host computer, a cache buffer, and a magnetic tape drive subsystem. The early end of tape subsystem utilizes outputs dependent upon capstan wheel movement, swing arm movement, and file reel movement in the magnetic tape subsystem, determining the net movement of tape therein, in order to measure the circumference of the file reel plus tape on the reel. Whenever a series of valid readings from a conventional sensor are obtained indicating that the circumference of the reel plus tape is approaching that of the reel itself (i.e., no-tape), a signal is sent to a microprocessor controlling the cache buffer, said signal indicating that end of tape is approaching. This signal may be used, for example, to prevent inability of writing buffered data to tape.

Other objects, advantages and novel features of this invention will become apparent from the following detailed description of a preferred embodiment when considered in conjunction with the accompanying drawings wherein:

DETAILED DESCRIPTION OF THE INVENTION

Figure 1:
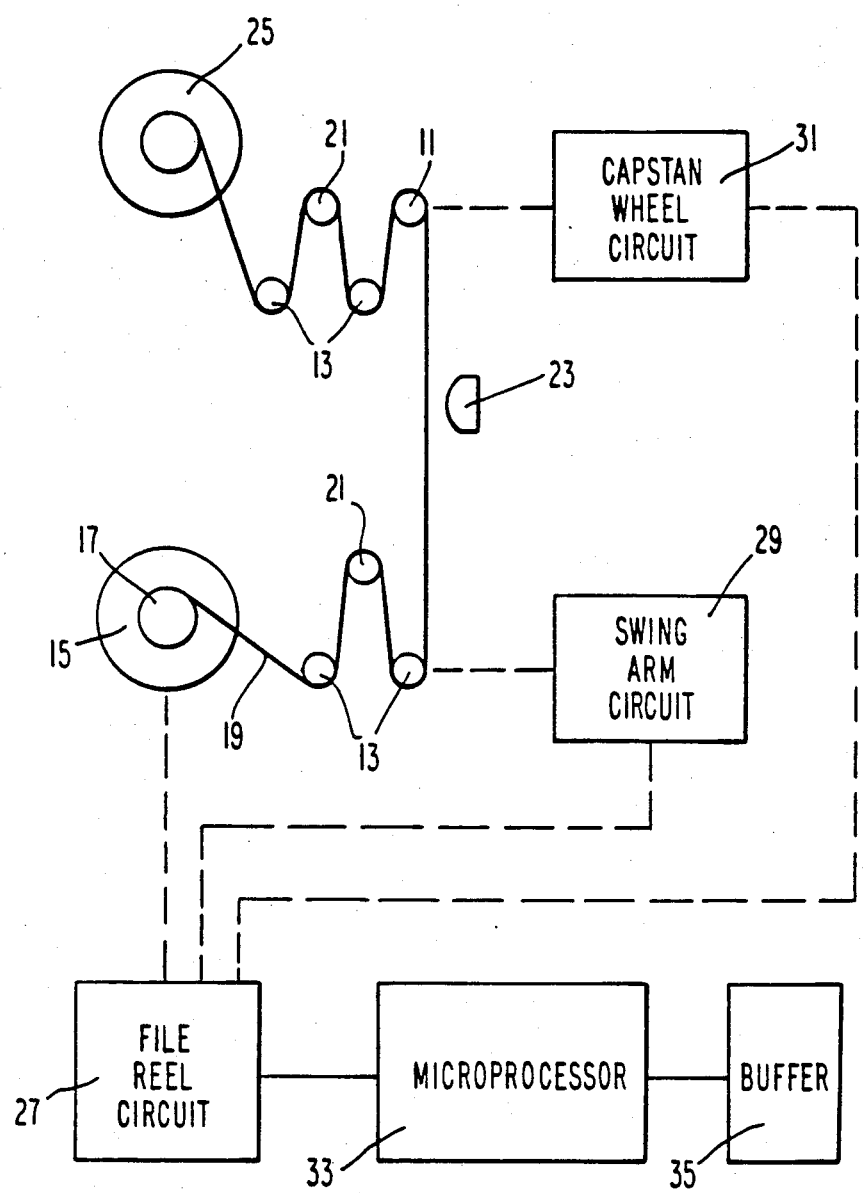
FIG. 1 is a block diagram of an early end of tape sensing subsystem according to the present invention.

Referring now to the drawings, wherein like characters designate like or corresponding parts throughout the several views, there is shown in FIG. 1 an early end of tape (EOT) sensing subsystem according to the present invention. The EOT sensing subsystem utilizes existing circuitry to determine when EOT is approaching by comparing movement of a conventional capstan wheel 11, swing arms 13, and file or supply reel 15.

As is conventional, the file reel 15 includes a hub 17 around which is wrapped a supply of magnetic tape 19. From the file reel 15, the magnetic tape 19 is first led under one swing arm 13, over a roller 21, and down under another swing arm 13 thereafter being fed passed a conventional read/write head 23. The tape 19 is then fed over the capstan wheel 11 through another set of swing arms 13 and roller 21, and is ultimately placed upon a take-up reel 25 in a conventional manner. The magnetic tape subsystem, as is typical, further includes a file reel circuit 27 which keeps track of the movement of the file reel 15 and controls a swing arm circuit 29 and a capstan wheel circuit 31, each of which are also designed to monitor movement of their respective components.

Figure 2:
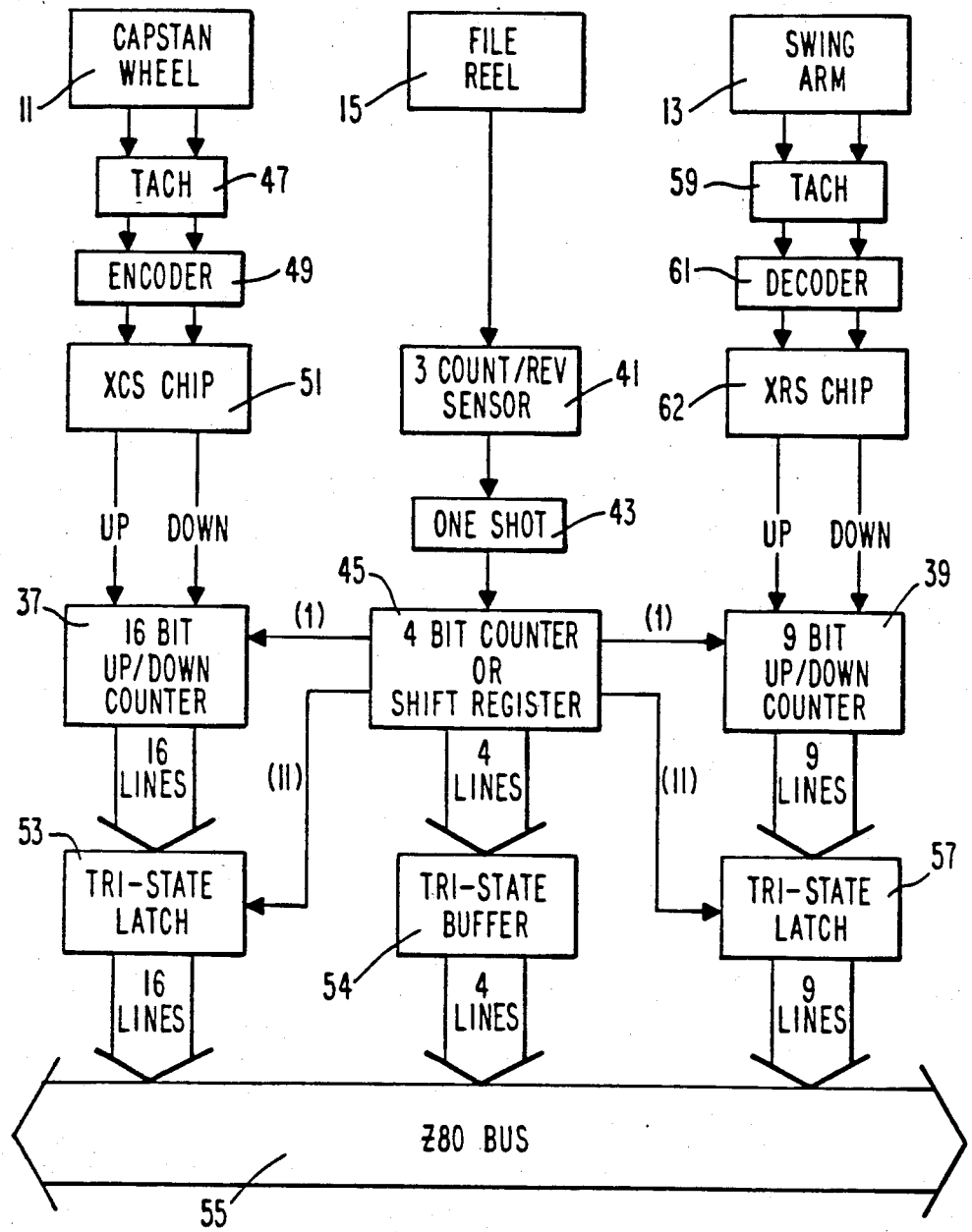
FIG. 2 is a block diagram illustrating data flow through the early end of tape subsystem shown in FIG. 1.

As is shown more clearly in FIG. 2, the main function of the file reel circuit 27 is, when signaled by a microprocessor 33 managing a buffer 35 (FIG. 1), to clear a pair of counters 37 and 39 coupled respectively to the capstan wheel 11 and swing arm 13, latch the outputs from those counters 37 and 39 when the file reel 15 has undergone one more revolution, and signal the microprocessor 33 that a new reading has been obtained.

Monitoring the revolutions of the conventional file reel 15, a file protect sensor 41 has its output directed to a one-shot multivibrator 43 prior to its being fed to a shift register 45 in order to condition the signal from the sensor 41 and to prevent mistriggering due to the slow rise time of sensors used in typical applications as the file protect sensor 41. In a presently preferred embodiment of the invention, the sensor 41 must be driven with a minimum of 10 kilohertz, 50% duty cycle signal in order for it to operate properly. When the microprocessor 33 is ready to calculate the amount of tape on the reel 15, it resets the shift register 45 to an all zeros setting. After the first sensor's breaking on the file reel 15 occurs, the shift register 45 shifts left a one (0001) which causes the capstan wheel and swing arm counters 37 and 39 to reset. As the file reel 15 rotates and the slots of the file protect sensor 41 are sensed, the shift register 45 shifts left its contents and ultimately shifts a one into the most significant bit.

Movement of the capstan wheel 11 is monitored by a conventional tach 47 utilizing an incremental encoder 49, the output from which comprises quarter tach pulses which are decoded by a decoder, preferably comprising an XCS chip, 51 feeding up and down signals to the capstan wheel counter 37. Outputs from the counter 37 go to a 16-bit latch 53 the output from which is fed to a bus 55 coupled to the microprocessor 33. The capstan wheel counter 37 is reset and the latch 53 is clocked by the file reel circuitry 27.

Like the capstan wheel circuit 31, the swing arm circuit 29 consists of the swing arm counter 39 and a latch 57. While the up/down counter 37 and latch 53 used in the capstan wheel circuit 31 are suitably comprised of 16-bit components, the swing arm circuit 29 utilizes 9-bit components. Outputs from a conventional swing arm tach 59 are decoded by a decoder 61, and are directed to the 9-bit swing arm counter 39. The outputs of the counter 39, as those of the capstan wheel counter 37, are fed to the microprocessor bus 55 through the latch 57, the counter 39 being reset and the latch 57 being clocked by the file reel circuit 27.

When the shift register 45 in the file reel circuit 27 shifts a one into the most significant bit, the counter latches 53 and 57 are clocked and the shift register 45 is disabled. Hence, the latches 53 and 57 indicate the counts relative to one rotation of the file reel 15, and will keep the same count until the microprocessor 33 reads the counters 37 and 39 again. The most significant bit of the shift register 45 is also directed to the microprocessor 33 so that the microprocessor 33 can poll that signal to determine when it becomes a logical one, thereby indicating that the file reel circuit 27, swing arm circuit 29, and capstan wheel circuit 31 include new values ready to be processed.

Referring now to FIGS. 3a-3d, a preferred algorithm for controlling the microprocessor 33 in a manner which determines early EOT sensing is shown i flow chart format. Briefly described, the algorithm permits the microprocessor 33 to execute early EOT sensing by first initializing the counters 37 and 39 and shift register 45. The shift register 45 is then reset, and if one revolution of the file reel 15 has been completed as determined by the file reel circuit 27, then the microprocessor 33 obtains a count from the capstan counter 37 and swing arm counter 39 in order to determine net movement of tape between the file reel 15 and the capstan 11. The amount of tape 19 remaining on the file reel 15 can be determined by calculating the circumference of the file reel 15 plus the tape 19 on the file reel 15. As shown in FIGS. 3a-3d, the preferred algorithm for calculating the circumference is by relative capstan wheel tach counts. In other words, for one revolution of the file reel 15, the capstan wheel 11 will rotate a proportional amount depending on the ratio of the radius of the capstan wheel 11 and the file reel 15. Attached to the capstan wheel 11, as explained with reference to FIG. 2, is an incremental, 1000 line encoder 49. By decoding the capstan encoder 49 into quarter tachs, the relative file reel radius can be converted into a number of capstan quarter tachs counts.

Each wrap on the file reel 15 at end of tape is approximately 1.34 feet. With the resolution of the capstan tach 47 being approximately 0.000942 inches, the radius of the file reel 15 can be calculated down to one wrap if all other variables are held constant. Each wrap will cause the capstan count to increase by approximately 10. Due to the uncertain nature of such a system, however, some predetermined number of wraps must be selected to give the best probability of detecting early EOT at a given number of feet away from EOT. This number must include the inaccuracies due to the number of wraps left on the file reel 15 when end of tape is encountered, file reel radius tolerances, net swing arm movement, and so forth. One of the major problems in utilizing movement of the swing arms 13 in calculating early EOT, is calculating the number of swing arm tach pulses per file reel revolution. The swing arm 13, like the file reel 15, has an encoder attached to it but the resolution of each swing arm count is approximately 32 capstan quarter tach counts. This implies that the swing arm 13 can cause up to a 32 count error for each count, correlating to a 3.2 wrap error, or approximately 4.3 feet for each count, in calculating the number of wraps left on the file reel 15. By empirically measuring the swing, arm movement with respect to capstan quarter tach counts (i.e., the "swing arm offset"), it has been found that the average resolution of swing arm movement in units of capstan quarter tach counts is 21 hex or 33 decimal.

Another consideration in calculating the number of tach counts is being able to exactly measure one revolution of the file reel 15. Any sensor used preferably should have a fast rise time so that movement of the file reel 15 can be accurately measured. An optical interrupter would be an ideal device, but the file protect sensor 41 is already installed in conventional magnetic tape subsystems and would thus simplify design and minimize cost. Using the file protect sensor 41, however, allows a larger inaccuracy of the tape 19 left on the file reel 15 due to its slow rise time.

As presently employed, the algorithm shown in FIGS. 3a–3d needs only approximately 128 bytes of code to perform its function. The only time consuming part of the routine is when the microprocessor 33 notices that the file reel 15 has already moved one revolution. At that point, the routine then has to read the counters 37 and 39, calculate the net movement in capstan quarter tach counts, and compare that value to EOT and error values. If three consecutive good counts are obtained, the microprocessor 33 then decides that the tape 19 is near EOT. Having three such consecutive good counts, therefore, decreases the probability of jumping out of the routine on a bad count.

An error condition is a number selected such that if the calculated swing arm net movement is less then such number, the measurement is disregarded and the algorithm is repeated. A count of such error conditions can be obtained if the file reel 15 stops on an edge of the sensor 41 and bounces back and forth across the sensor, or if the swing arm 13 is moving so fast when the latch 57 is clocked that an incorrect swing arm position is obtained because the clock contained in the microprocessor 33 did not latch the counters 37 and 39 at exactly one revolution.

Figure 3A:
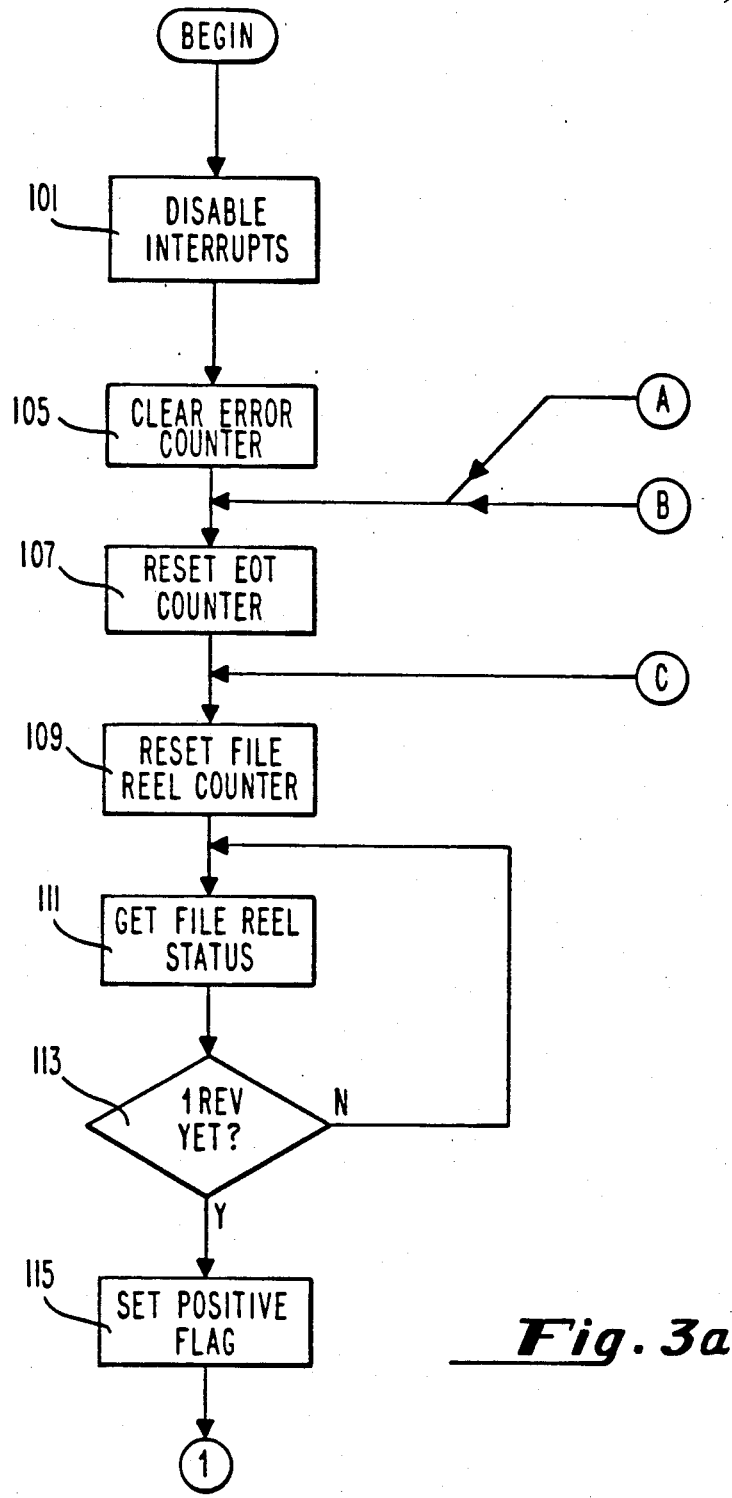
FIGS. 3a–3d illustrate a flow chart diagram of the preferred means for implementing the early end of tape sensing subsystem shown in FIG. 1.

As is shown in FIG. 3a, the microprocessor first disables any interrupts at step 101 and clears a software error counter at step 105. If a minimum count is, not greater than the capstan count plus a predetermined number for safety, or the capstan count plus safety net is not greater than or equal to the error count, the software error counter is incremented at step 143 (FIG. 3c) and software EOT counter is reset at step 107. If the software EOT counter does not indicate a count of three, the file reel counter or shift register 45 is reset at step 109, whereupon the microprocessor 33 obtains file reel status at step 111 to determine whether one revolution has been completed at step 113.

Figure 3B:
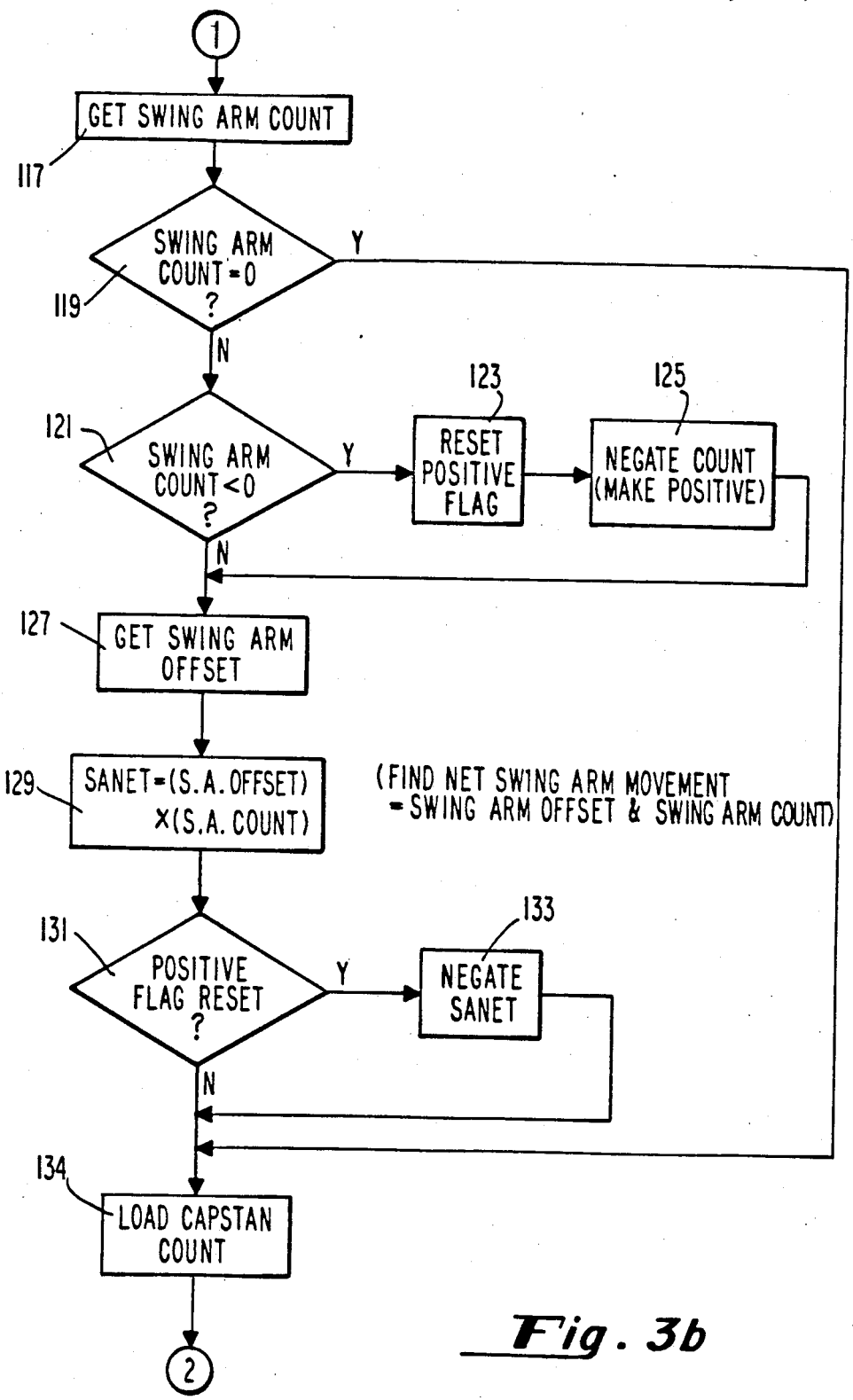

Once it has been determined that one revolution of the file reel 15 has been completed, a positive flag is set at step 20 115, the swing arm count is obtained at step 117 from the swing arm counter 39, and if not a zero value as determined at step 119, checked see whether it is less than zero at step 121. If the swing arm count is zero, the microprocessor 33 then goes directly to step 134 where it loads a capstan count from the capstan counter 37. When the swing arm count as determined by step 121 is less than zero the positive flag set at step 115 is reset at step 123 and the count is made positive at step 125. A swing arm offset, empirically determined, is obtained from a lookup table (not shown) contained within the microprocessor 33 at step 137 and is used to calculate a swing arm net movement at step 129. As shown in FIG. 3b, the swing arm net movement is equivalent to the empirically determined swing arm offset times the swing arm count obtained from the counter 39. If the positive flag has been reset, as determined at step 131, the swing arm net movement is negated at step 133. Otherwise, the microprocessor 33 makes negative the capstan count at step 133.

Figures 3C, 3D:
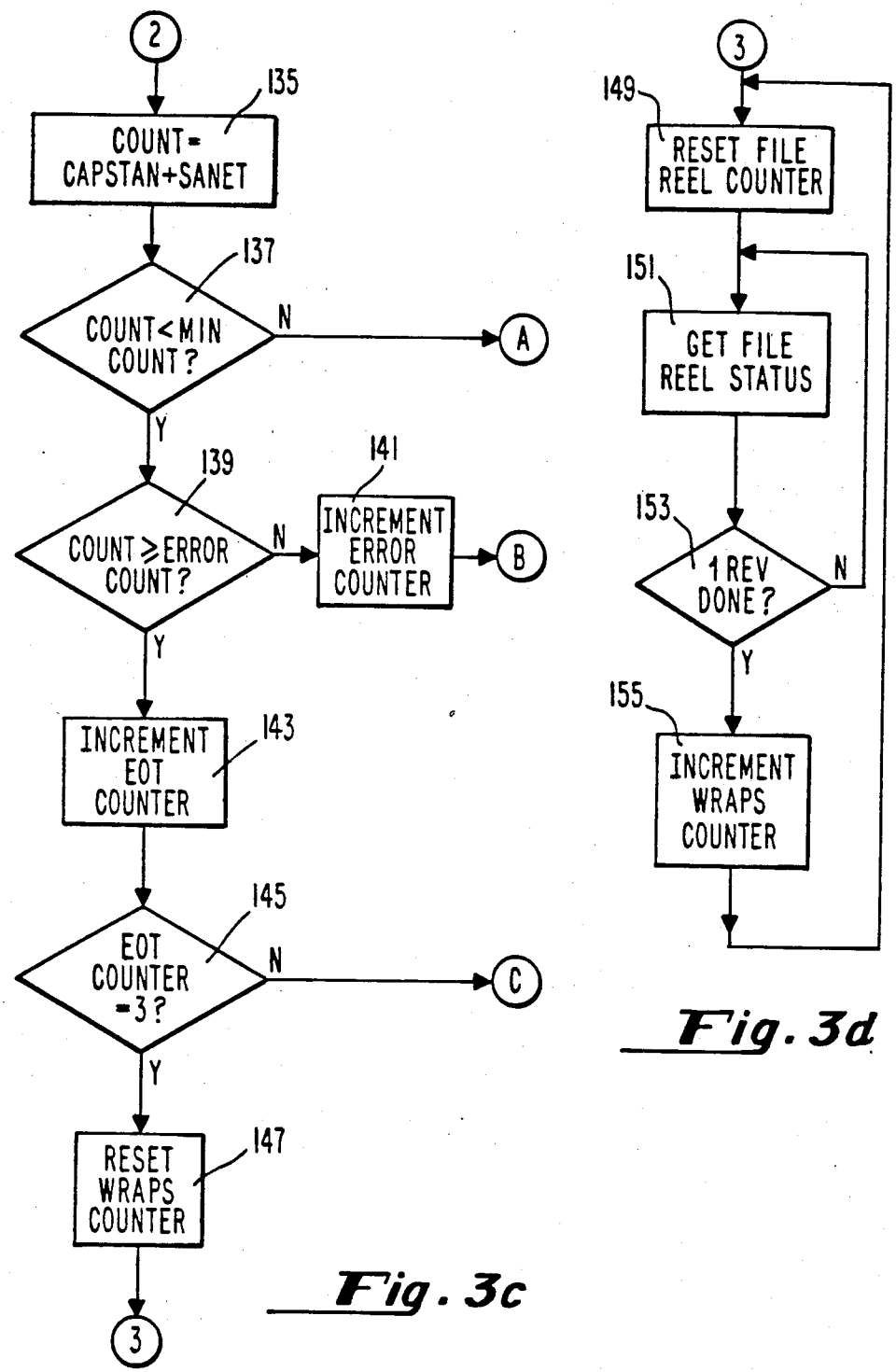

The amount of tape remaining on the file reel 15, as indicated by a "count" corresponding to the capstan count plus the swing arm net movement is then calculated at step 135, compared to the predetermined minimum count at step 137 and error count at step 139. If the count indicative of net movement is less than the minimum count and greater than the error count the software EOT counter is incremented at step 143 and checked to determine whether its count is equivalent to three, indicating three valid counts If so, a software wraps counter is reset at step 147, the microprocessor 33 indicates an early EOT condition and the algorithm is continued as shown in FIG. 3d.

The file reel counter or shift register 45 is then reset at step 149, a status of the file reel obtained at step 151 to determine whether one revolution has been completed. When one revolution has been completed as determined at step 153, the software wraps counter is incremented at step 155.

As is apparent from the foregoing description, conventionally installed hardware used in typical magnetic tape drives can be further used to determine early EOT sensing. Once the microprocessor 33 initializes the file reel circuit 27, swing arm circuit 29, and capstan wheel circuit 31, the hardware contained in the magnetic tape drive operates without interruption until a new reading is obtained. Such an arrangement reduces overhead of monitoring the hardware and creating interrupts at each sensor change for the microprocessor 33. Since the software requirements of the algorithm described with respect to FIGS. 3a–3d is minimal, the microprocessor 33 is thus freed up for further control of the cache buffer 35 and communications to a host computer.

Obviously many modifications and variations of the present invention are possible in light of the foregoing teachings. It is therefore to be understood that within the scope of the appended claims, the invention may be practiced otherwise then as specifically described.

What is claimed is:

1. A method of predicting an end of tape (EOT) condition in tape used in a magnetic tape drive subsystem of a data processing system which includes a host computer, said magnetic tape drive subsystem having a capstan wheel, file reel, and one or more swing arms being said file reel and said capstan wheel in order to control the tension of said tape therebetween, wherein said magnetic tape drive subsystem is coupled to a microprocessor managing a cache buffer that is adapted to optimize a flow of data between said host computer and said magnetic tape drive subsystem, comprising:

counting a first number, said first number indicative of capstan wheel revolutions;

counting a second number, said second number indicative of movements of said one or more swing arms which control the tension of said tape between said file reel and said capstan wheel;

offsetting said second number by a factor relating the movements of said one or more swing arms to the revolutions of said capstan wheel, said second number offset by said factor yielding an offset number;

determining a net movement of said tape between said file reel and said capstan wheel by adding said first number to said offset number, thereby yielding a determined net movement count;

first comparing said determined net movement count to an error count having a preselected upper limit to determine whether said determined net movement count is greater than or equal to said error count;

incrementing an end of tape count when said first comparing step yields a determined net movement count greater than or equal to said error count;

second comparing said end of tape count to a preselected threshold count; and indicating to said host computer that an early end of tape condition exists when aid second comparing step yields an equality.

2. The method according to claim 1, further comprising the steps of:

resetting said first number to zero; and starting a new count of said first number when said second comparing step does not yield an equality, and thereafter repeating each said subsequent step until second comparing step yields an equality.

3. The method according to claim 1, further comprising the steps of:

resetting said end of tape count to zero;

resetting said first number to zero; and starting a new count of said first number when said first comparing step yields a determined net movement less than said error count.

4. The method according to claim 1, further comprising the step of ceasing a transfer of data between said cache buffer and said magnetic tape subsystem when said host computer receives said indication of an early end of tape.

5. A method of preventing an overwriting of data on a magnetic tape by data being transferred to said tape from a cache buffer coupled to a host computer, said wherein said tape is mounted in a magnetic tape drive subsystem of a data processing system including said host computer, said magnetic tape drive subsystem having a capstan wheel, file reel, and swing arm means between said file reel and said capstan wheel for controlling the tension of said tape between said capstan wheel and said file reel, wherein said magnetic tape drive subsystem is coupled to a microprocessor managing said cache buffer in order to optimize a flow of data between said host computer and said magnetic tape drive subsystem, comprising the steps of:

(a) counting a first number, said first number indicative of a number of revolutions of said capstan wheel;

(b) counting a second number, said second number indicative of movements of said swing arm means;

(c) offsetting said second number by a factor relating the movements of said swing arm means to the revolutions of said capstan wheel, said second number offset by said factor yielding an offset number;

(d) determining a net movement of said tape between said file reel and said capstan wheel by adding said first number to said offset number, thereby yielding a determined net movement count;

(e) first comparing said determined net movement count to an error count having a preselected upper limit to determine whether said determined net movement count is greater than or equal to said error count;

(f) incrementing an end of tape count when step (e) yields a determined net movement count greater than or equal to said error count;

(g) second comparing said end of tape count to a preselected threshold count;

(h) starting a new count of said first number from zero when step (g) does not yield an equality;

(i) repeating steps (a) through (g) until step (g) yields an equality;

(j) causing an indication to be sent to the microprocessor that an early end of tape condition exists when step (g) yields an equality;

(k) otherwise resetting said end of tape count to zero;

(l) starting a new count of said first number from zero when step (e) yields a determined net movement less than said error count;

(m) repeating steps (i) and (j); and (n) causing said microprocessor to cease a transfer of data between said cache buffer and said magnetic tape subsystem when said microprocessor receives said indication of an early end of tape.

* * * * *

UNITED STATES PATENT AND TRADEMARK OFFICE
CERTIFICATE OF CORRECTION

PATENT NO. : 4,811,132

DATED : March 7, 1989

INVENTOR(S) : Hunter et al.

It is certified that error appears in the above-identified patent and that said Letters Patent is hereby corrected as shown below:

Column 4, line 6, please change "i" to --in--.

Column 5, line 42, please delete "20".

Column 5, line 44, insert --to-- after "checked".

Column 6, line 39, please change "being" to --between--.

Column 7, line 2, please change "aid" to --said--.

Signed and Sealed this

Third Day of October, 1989

Attest:

DONALD J. QUIGG

Attesting Officer

Commissioner of Patents and Trademarks